Sept. 21, 1948.                    W. S. DUTTERA                    2,449,739
                        APPARATUS FOR DETECTING VARIATIONS
                                IN LOAD IMPEDANCES
                                Filed May 19, 1945
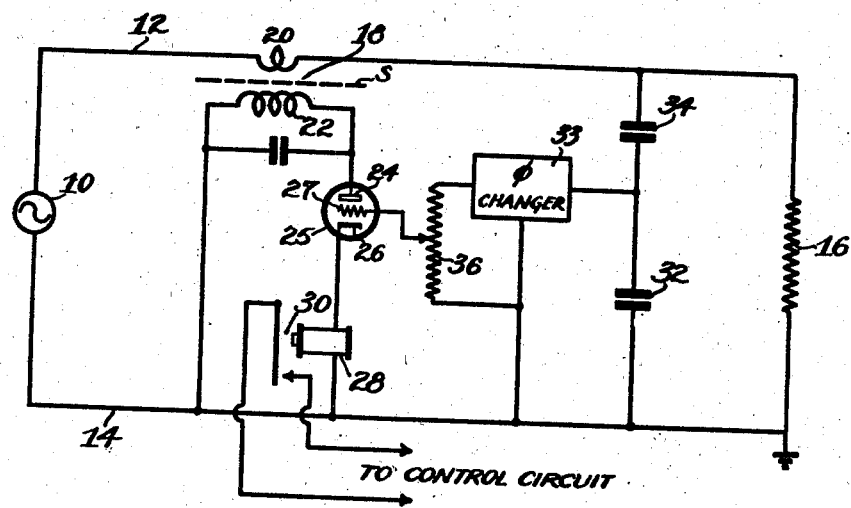
                                                        INVENTOR.
                                            WILLIAM S. DUTTERA
                                        BY
                                              H. S. Grover
                                                ATTORNEY Patented Sept. 21, 1948

2,449,739

UNITED STATES PATENT OFFICE 2,449,739

APPARATUS FOR DETECTING VARIATIONS IN LOAD IMPEDANCES

William S. Duttera, Lynbrook, N. Y., assignor to Radio Corporation of America, a corporation of Delaware Application May 19, 1945, Serial No. 594,761

3 Claims. (Cl. 177—311)

The present invention relates to monitoring or supervising circuits, and more particularly, to such circuits for detecting impedance variations in alternating current loads.

An object of the present invention is the provision of a device which is responsive to variations in the impedance of a circuit to which it is connected.

Another object of the present invention is the provision of a circuit for detecting variations in impedance of a radio frequency load circuit.

A further object of the present invention is the provision, for a radio transmitter, of means for detecting variations in antenna impedance.

Still another object of the present invention is the provision of means as aforesaid which may be completely contained within the output stage of a radio transmitter.

Still a further object of the present invention is the provision of means for detecting impedance change or arc-over conditions in a transmitting antenna without requiring complex multiple couplings to the transmission lines connecting said transmitting antenna to the transmitter.

Still another object of the present invention is the provision of detecting means for impedance change or arc-over conditions in a transmitting antenna without requiring the use of long monitoring leads.

The foregoing objects and others which may appear from the following detailed description are accomplished according to the principles of the present invention by connecting the primary of a current transformer in series with an output lead from a radio transmitter and a voltage divider and phase shifter network across the output circuit. Thus, two sources of potential are provided, one proportional to the current drawn by the load on the transmitter and the other proportional to the voltage across the load. A three-element thermionic tube is so connected that one of said sources provides its anode potential and the other source provides a control grid potential. The phase shifter network is so adjusted that under normal operating conditions a predetermined small value of anode current flows through the tube. This small value may be decreased to zero if desired. Then upon the occurrence of a change of impedance of load connected to said transmitter such as may be caused by icing conditions, arc-overs or mechanical disarrangements of an antenna, a phase or amplitude change occurs in the potentials applied to the anode and control grid circuits of the tube. A current or an increased amount of current then flows through the anode-cathode of the tube. This current may be utilized to control an alarm or a relay to remove power from the transmitter until the disarrangement has been cleared.

While the present invention is explained particularly with reference to a radio transmitter and an associated transmitting antenna, the usefulness of the invention is not thus limited. It may be used wherever it is desired to detect a change in the impedance of the load circuit.

The present invention will be more fully understood by reference to the following detailed description which is accompanied by the drawing in which reference numeral 10 indicates diagrammatically a source of high frequency energy such as a radio transmitter. The source of radio frequency 10 is connected by a transmission line such as that constituted by conductors 12 and 14 to a load 16. Load 16 may be a transmitting antenna of any desired type or any other utilization circuit for the high frequency energy generated by source 10.

A voltage proportional to the amplitude and phase of the current flowing in the transmission line from source 10 to load 16 is derived by a current transformer 18, having a primary 20 in the transmission line, and a secondary 22 coupled to the primary 20. If desired, primary and secondary may be electrostatically shielded by shield S. One end of the secondary winding 22 is connected to anode 24 of thermionic discharge tube 25, the other end of the winding being connected to conductor 14 of the transmission line.

The cathode 26 of the thermionic discharge tube 25 is connected to conductor 14 through the winding 28 of relay 30. It will be seen that a voltage proportional to the magnitude and phase of the current flowing in conductor 12 is by the foregoing connections applied across the anode-cathode discharge path of tube 25.

A voltage proportional to the amplitude and phase of the line voltage is obtained by a capacitive voltage divider connected between conductors 12 and 14. The capacitive voltage divider may include condensers 32 and 34 connected in series. The connection between condensers 32 and 34 is connected to a phase controlling network 33, having a potentiometer 36 connected across its output circuit. The movable tap on potentiometer 36 is connected to the control grid 27 of tube 25. The coupling between windings 20 and 22, the setting of potentiometer 36 and the adjustment of phase controlling network 33 are so adjusted that the resultant grid and plate voltages applied to tube 25, produce very little or no anode current through the tube. Thus, relay 30 is maintained in a normal unoperated condition.

When the phase relationship of the voltages applied to anode 24 and grid 27 is changed by a change in impedance of load 16, the balance is disturbed and plate current then flows through tube 25.

When this occurs the relay 30 is operated thus closing an ancillary control circuit connected thereto. The current flowing in the control circuit may be utilized to operate an alarm or it may be utilized to operate a relay to remove the power from the source of radio frequency energy 10 until the cause of the disturbance has been cleared. The change in impedance of load 16 may be caused by icing conditions on the antenna, by an arc-over in the antenna structure or by a mechanical disarrangement of the antenna structure. If desired, a current indicating instrument may be substituted for relay 30 so as to obtain a continuous visual indication of the relative impedance of load 16 at all times.

While I have particularly described one embodiment of the present invention, it should be distinctly understood that my invention is not limited thereto but that modifications may be made within the scope of the claims.

What is claimed is:

1. In a circuit including a source of high frequency energy and a load, means for deriving a potential proportional to the current drawn by said load, means for deriving a potential proportional to the voltage across said load, means for applying one of said potentials to the anode-cathode circuit of a thermionic discharge tube, means for applying the other of said potentials to a control electrode of said thermionic discharge tube, means for so adjusting the amplitude and phase of one of said potentials with respect to the other that under normal conditions a minimum current flows in the anode-cathode circuit of said thermionic discharge tube, and means responsive to an increased flow of current in said anode-cathode circuit for controlling an alarm circuit.

2. In a circuit including a source of high frequency and a load, means for deriving a potential proportional to the current drawn by said load, a thermionic discharge tube having an anode, a cathode and a control electrode, means for applying said potential to said anode and cathode, means for deriving a potential proportional to the potential across said load, means for applying said second potential to the control electrode of said discharge tube, means for so adjusting the phase and amplitude of the second said potential with respect to the first said potential that under normal conditions a minimum current flows in the anode-cathode circuit to said thermionic discharge tube, and means coupled to said anode-cathode circuit and responsive to an increase in current flow in said circuit for controlling an alarm circuit.

3. In a circuit including a source of high frequency and a load, means for deriving a potential proportional to the current drawn by said load, a thermionic discharge tube having an anode, a cathode and a control electrode, means for applying said potential to said anode and cathode, means for deriving a potential proportional to the potential across said load, means for applying said second potential to the control electrode of said discharge tube, means for so adjusting the phase and amplitude of the second of said potentials with respect to the first said potential that under normal conditions a minimum current flows in the anode-cathode circuit of said thermionic discharge tube, and means coupled to said anode-cathode circuit and responsive to an increase in current flow in said circuit for initiating a current flow in an ancillary circuit.

WILLIAM S. DUTTERA.

REFERENCES CITED

The following references are of record in the file of this patent:

UNITED STATES PATENTS

| Number | Name | Date |
| --- | --- | --- |
| 1,728,835 | Petch | Sept. 17, 1929 |
| 1,936,414 | Stone | Nov. 21, 1933 |
| 2,369,678 | McWhirter et al. | Feb. 20, 1945 |